United States Patent
Masaie et al.

[11] Patent Number: 6,146,768
[45] Date of Patent: Nov. 14, 2000

[54] WELDING WIRE

[75] Inventors: Norio Masaie; Hiroyuki Shimizu; Kuniaki Miyazaki, all of Fujisawa; Takenori Nakayama; Shinji Sakashita, both of Kobe, all of Japan

[73] Assignee: Kabushiki Kaisha Kobe Seiko Sho, Kobe, Japan

[21] Appl. No.: 09/037,873

[22] Filed: Mar. 10, 1998

[30] Foreign Application Priority Data

Mar. 11, 1997 [JP] Japan ...................................... 9-056343
Feb. 20, 1998 [JP] Japan ................................... 10-038442

[51] Int. Cl.[7] .............................. B32B 9/00; B23K 35/02
[52] U.S. Cl. ....................... 428/472.2; 428/469; 428/375; 428/379; 428/385; 428/698; 219/145.1
[58] Field of Search ..................................... 428/375, 379, 428/698; 219/145.1, 145.21, 145.23, 145.41, 145.31; 140/112; 72/41, 42

[56] References Cited

U.S. PATENT DOCUMENTS

| | | | |
|---|---|---|---|
| 3,868,487 | 2/1975 | Ito et al. | 219/73 |
| 3,868,491 | 2/1975 | Ito et al. | 219/146 |
| 4,256,949 | 3/1981 | Bauman et al. | 219/146.24 |
| 4,308,182 | 12/1981 | Eckard et al. | 260/18 R |
| 4,816,085 | 3/1989 | Flasche et al. | 148/327 |
| 4,913,927 | 4/1990 | Anderson | 427/37 |
| 4,927,024 | 5/1990 | Anderson | 219/137.61 |
| 5,550,348 | 8/1996 | Massaie et al. | 219/145.22 |
| 5,672,287 | 9/1997 | Massaie et al. | 219/145.22 |

FOREIGN PATENT DOCUMENTS

| | | |
|---|---|---|
| 5-69181 | 3/1993 | Japan . |
| 5-131291 | 5/1993 | Japan . |
| 7-314179 | 12/1995 | Japan . |
| 8-19893 | 1/1996 | Japan . |
| 8-150494 | 6/1996 | Japan . |
| 8-157858 | 6/1996 | Japan . |
| 9-253880 | 9/1997 | Japan . |

Primary Examiner—Deborah Jones
Assistant Examiner—Stephen Stein
Attorney, Agent, or Firm—Oblon, Spivak, McClelland, Maier & Neustadt, P.C.

[57] ABSTRACT

A welding wire capable of improving wettability between weld metal and wire surface, thereby providing excellent drawability and weldability in resistance welding of wires is provided. A wire is dipped in an aqueous solution of a sulfide of alkali metal or ammonium sulfide to generate iron sulfide ($FeS_2$ or $FeS$) on the surface, whereby the wettability of weld metal to wire surface is improved in the resistance welding of the resulting wires. The S in the iron sulfide is preferably present in an amount of 0.1–20 atomic % as measured by X-ray photoelectron spectroscopy. At least one sulfide of S with an element of Mn, Ti, Cu, Cr, Ni, Al or Zn can be used instead of or in addition to the iron sulfide.

5 Claims, 2 Drawing Sheets

COMPARATIVE

WELDING WIRE

BACKGROUND OF THE INVENTION

1. Field of the Invention

This invention relates to welding wires used for automatic welding or semi-automatic welding of carbon steel or stainless steel and, more particularly, to welding wires capable of improving wire resistance weldability in manufacturing or productivity, and also improving wire feedability in welding.

2. Description of the Prior Art

In the manufacture of welding wires, generally, drawing is interrupted every lot of raw material. When the drawing is restarted, the wire of the following lot is joined to the wire of the lot which was drawn till then to omit the wire passing procedure through each drawing die of this lot. If the wire should be broken in the middle of drawing, it is necessary to quickly join the broken part to restart the drawing. Further, when a welding wire is wound onto a spool or housed in a pail pack, joining of wires of different lots is frequently performed in order to improve the yield of product. In such a joining of wires (wire welding), mechanical caulking by use of a sleeve, joining by resistance welding, and combination of the both are conventionally employed.

It is disclosed, for example, to mutually join wires by inserting the end parts of the wires to a sleeve having an inside diameter slightly larger than the outer diameter of the wire, and mechanically caulking them from above the sleeve (Japanese Utility Model Laid-Open No. 6-69411). Although the use of this method never causes a dispersion in welding strength nor requires any high skill for the joining work, the joined part can not be drawn as it is since the outer diameter of the sleeve is larger than the wire diameter.

It is also proposed to mutually connect two wires by reducing the outer diameter of the end parts of the wires to insert them to a sleeve having an outer diameter substantially equal to the outer diameter of the wires, and spot welding the sleeve to hoops in the wire end parts (Japanese Patent Application Laid-Open No. 7-116893). When the wires are mutually joined by this method, the joined part can not be a commercial product as welding wire since the chemical composition is differed between the sleeve and the wires.

Therefore, in the mutual joining of welding wires, generally, resistance welding is most frequently used because of its low equipment cost and satisfactory appearance and strength of the joined part. As the resistance welding method of welding flux-contained wires, it is disclosed to pressurize and crimp the wire end part after removing the flux involved in the wire in this part, and resistance weld the tip part formed of only the metal hoop component (Japanese Patent Publication No. 5-1118). It is also known to remove the flux involved in the wire in the wire end part, and fill Ni powder into this end part instead of the flux followed by resistance welding (Japanese Patent Application Laid-Open No. 6-262392). When the resistance welding is executed after the flux is removed as described above, a welded product of constant quality can be provided, but a problem of complication of welding work arises.

The resistance welding of wires is mostly executed by polishing the end surfaces of two wires to be joined, nipping the end surfaces of the wires by electrodes so as to be opposite to each other to contact pressurize the both, and also applying a current thereto. When the current is applied to the two wires, the contact pressurized wire end surfaces and the wires around them are heated and molten by the Joule heat by the current-carrying. When the current is I, and the electric resistance of the part to which the current is carried is R, the Joule heat W is calculated by the following mathematical expression 1.

$$W = I^2 \times R$$

The current I is generally alternating current, and the Joule heat W corresponds to the value obtained by multiplying the square of the ac I by the resistance R of a weld. When the wire end surfaces are arranged so as to be mutually opposed with pressure, and the both are joined together by resistance welding, the resistance R is the highest in the contact of the wire end surfaces. Thus, the heating is started first in the wire end surfaces.

The contact of the wire end surfaces is instantaneously molten because its heat capacity is extremely small to the calorific value, and the two wires are pressurized, whereby the molten metal is carried and discharged to the circumferential parts of the wires. The discharged initial molten part is generally cut and removed by a welding worker. The wire joining by resistance welding is widely used as general joining technique since the wires can be easily joined together in an extremely short time at low cost.

However, this joining largely depends on the skill of the worker, and has a problem in that a weld of high quality can not be constantly formed. For example, selection of cut form of wire end surface, pressurizing force, welding time or the like depends on the experience of the worker. In the joining of welding wires drawn to a product diameter by resistance welding, particularly, the wettability of the weld metal not only on the weld surface but also near the weld part with the wire surface has a significant influence on the product performance as welding wire. When the wettability between the weld metal and wire surface is poor, it becomes necessary to sufficiently file the surface, resulting in a remarkable reduction in efficiency of the wire welding.

This filing often scratches a sound wire surface which requires no filing, and such a damaged wire surface makes the wire feedability or electric conductivity unstable in the welding by use of this wire. Further, the poor wettability of the weld metal near the weld part causes the breaking of the wire, a feeding failure, and an unstable arc in the actual welding by use of this wire. According to the recent improvement in quality of welding wires, the welding uniformity of the weld part which was not a problem in the past is also required to be improved.

When wires are mutually welded only for joining purpose, the current I is properly selected for resistance welding according to the kind of wire such that whether the wire is for soft steel or for stainless steel, or whether the cored flux is present or not since the resistance R of the wire is changed depending on the chemical composition, dislocation density and flux ratio of the wire, whereby the wires can be easily joined. However, when the performance as welding wire is also taken into consideration, with respect to the part joined by resistance welding, the control of only the resistance welding current is not sufficient, and an improvement in wettability between weld metal and wire surface is an essential condition in order to provide an excellent performance as wire.

Further, characteristics desired as welding wire include satisfactory wire feedability. A number of attempts were made to improve the wire feedability in the past. The improvement in wire feedability by adhering sodium salt or potassium salt of a higher fatty acid such as stearic acid, oleic acid, linoleic acid, linolenic acid or the like to the wire surface and applying a lubricating oil thereon after finish drawing (Japanese Patent Application Laid-Opened No. 1-166898) and the improvement in wire feedability by retainably adhering an oily lubricant containing sodium carboxylate or potassium carboxylate onto the wire surface (Japanese Patent Application Laid-Open No. 2-284792) are known. In these method, proper quantities of alkali salt of higher fatty acid and lubricating oil are adhered to the wire surface, whereby the wire feedability is improved. Since the metal salt and lubricating oil are likely to be peeled from the wire surface and accumulated within a spring liner when the welding work is executed over a long time, the oil is deposited in the spring liner, and the wire feedability is consequently lowered. Such a peeling is resulted from the weak bonding strength of the wire surface with the higher fatty acid salt and the lubricating oil.

SUMMARY OF THE INVENTION

This invention has been achieved to solve such problems described above. An object of this invention is thus to provide welding wires capable of improving the wettability between weld metal and wire surface in joining of wires by resistance welding, whereby excellent drawability, weldability, and wire feedability can be provided.

One welding wire according to this invention is characterized by that at least one iron sulfide selected from the group consisting of $FeS_2$ and $FeS$ is present on a degreased wire. The "presence of iron sulfide" referred to herein means the state where $FeS_2$ or $FeS$ is generated over the whole wire surface and, in other words, that the peak of $FeS_2$ or $FeS$ can be confirmed over the whole wire surface when the wire surface is analyzed by confirming the presence of the iron sulfide by X-ray photoelectron spectroscopy described later.

Since the presence of the part other than $FeS_2$ or $FeS$ on the wire is naturally conceivable when the wire surface is more microscopically observed, it is not objectionable that the peak of a material other than $FeS_2$ or $FeS$ is simultaneously observed in X-ray photoelectron spectroscopic measurement.

The S present as the iron sulfide ($FeS_2$, $FeS$) is preferably contained in an amount of 0.1–20 atomic % by X-ray photoelectron spectroscopically measured value.

The other welding wire according to this invention is characterized by that a sulfide of S with at least one element selected from the group consisting of Fe, Mn, Pi, Cu, Cr, Ni, Al and Zn is present on a degreased wire surface. The "presence of a sulfide" referred to herein means, just as the "presence of iron sulfide" described above, the state where a sulfide of S with at least one element selected from the group described above is generated over the whole wire surface when the wire surface is macroscopically observed. In other words, it means that the peak of the above-mentioned sulfide can be confirmed over the whole wire surface when the wire surface is analyzed by confirming the presence of the sulfide by X-ray photoelectron spectroscopy. Similarly to the case of iron sulfide, it is not objectionable that the peak of a material other than it is observed.

The S as the sulfide is preferably contained in an amount of 0.1–20 atomic % by X-ray photoelectron spectroscopically measured value.

In this invention, the presence of the iron sulfide ($FeS_2$, $FeS$) or the sulfide on the wire surface is confirmed by X-ray photoelectron spectroscopy. The S content in the iron sulfide ($FeS_2$, $FeS$) or in the sulfide can be calculated also by X-ray photoelectron spectroscopy.

DETAILED DESCRIPTION OF THE INVENTION

Figure 1:
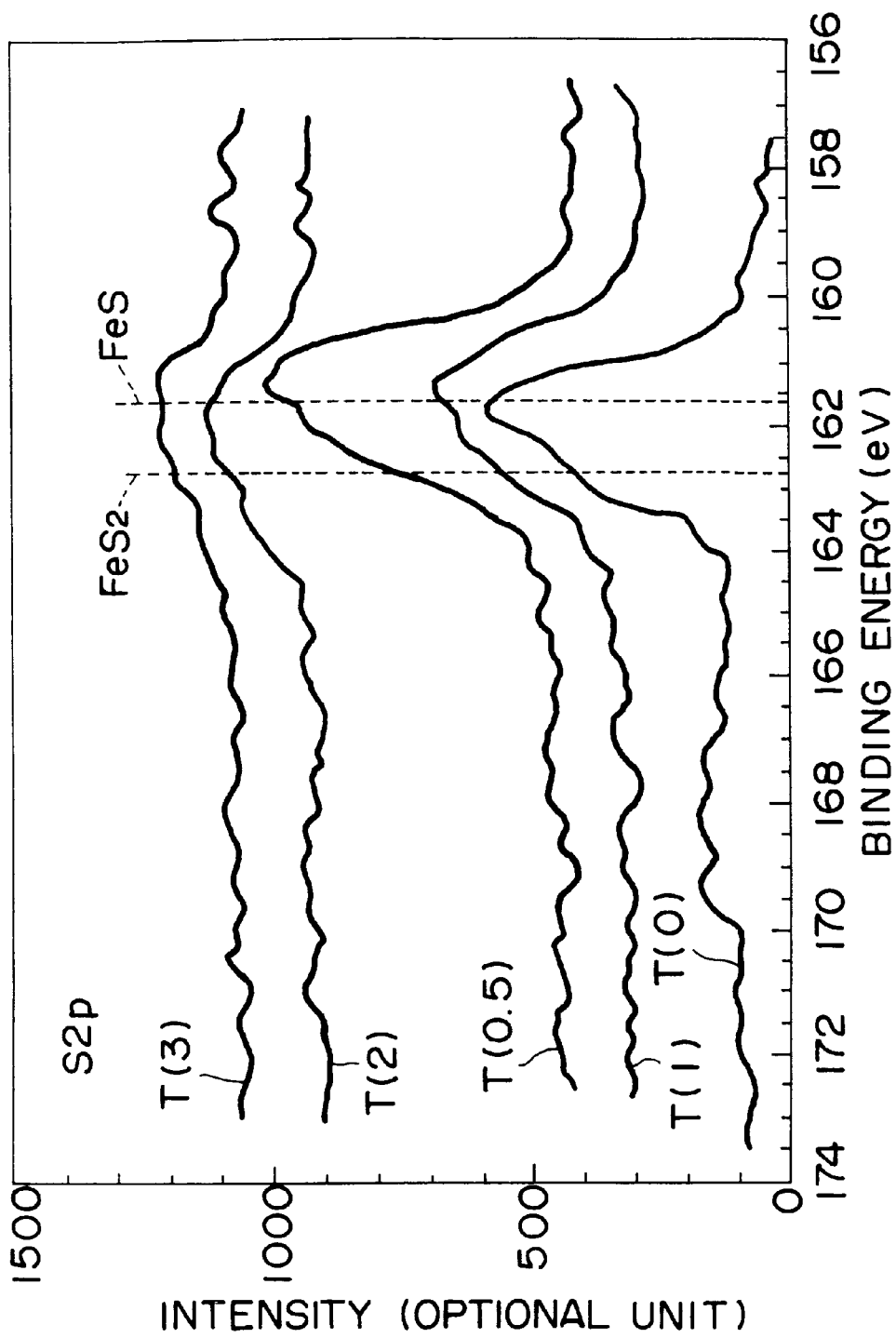
FIG. 1 shows a graph showing the binding energy distribution of a wire surface on which iron sulfide ($FeS_2$, $FeS$) is generated.

As a result of the earnest experiments and studies to solve the above problems, the present inventors found that wettability between weld metal and wire surface can be improved by adhering or generating iron sulfide ($FeS_2$, $FeS$) on a wire surface, and the iron sulfide ($FeS_2$, $FeS$) on the wire surface can improve also wire feedability. The S present in the molten wire remarkably reduces the viscosity and surface tension of the weld metal. Therefore, when S is present in the wire, a burn through of weld metal is apt to occur since the viscosity and surface tension of the weld metal are reduced by the S in the weld metal in the resistance welding of the wires.

Since S is an activated element, however, the wettability with the adjacent solid soft steel (wire) surface is improved by the presence of S, when present on the surface of the weld metal, to enhance the wettability between the weld metal and the wire surface.

The presence of the iron sulfide ($FeS_2$, $FeS$) on the wire surfaces leads to an improvement in the wettability, conformability, or bonding strength between wire surface and wire feeding oil, and the wire feeding oil is hardly dropped down even when the wire surface is slid with the spring liner or the like, so that the wire feedability in continuous welding is remarkably improved.

As a prior art, an arc welding wire improved in wire feedability and current-carrying stability by adhering a proper amount of $MoS_2$ on the wire surface is disclosed (Japanese Patent Application Laid-Open No. 8-19893). Even if S is present on the wire surface in the form of $MoS_2$, however, S is apt to be separated from the wire surface because of the insufficient sticking force of S with iron, so that the wettability between weld metal and wire surface can not be improved.

Since S is present on the wire surface in the form of iron sulfide ($FeS_2$, $FeS$) in this invention, the wire weldability in resistance welding can be improved. When S as the iron sulfide ($FeS_2$, $FeS$) is contained in the wire surface in an amount of 0.1–20 atomic %, particularly, the wettability between weld metal and wire surface can be more improved. The quantity of S on the wire surface can be measured by X-ray photoelectron spectroscopy. In this case, the quantity of S in the area to a depth of several nm from the wire surface can be determined by atomic %.

For diffusing the S on a wire surface layer part and concentrating the S, it is known to apply various sulfides on the wire surface followed by annealing at 650° C.–1250° C. for 1–300 minutes, and plating the resulting wire after pickling followed by drawing into a product (Japanese Patent Application Laid-Open No. 7-314179). In this method, a diffusion layer of S having a high concentration is formed on the wire surface layer part, whereby the surface tension of the molten drop is reduced to suppress sputtering. Although the effect as S can be expected in this method since the S is present as single body on the wire surface layer part, it is apparent that the wire feedability can not be improved since no iron sulfide ($FeS_2$, $FeS$) is present on the wire surface. The reason that no iron sulfide ($FeS_2$, $FeS$) is generated on the wire surface is that the wire surface is annealed at a high temperature of 650° C. or more in the atmosphere after applying S source thereto. Since the decomposition temperature of iron sulfide ($FeS_2$) in the atmosphere is 600° C., the S source on the wire surface is easily decomposed and oxidized, and diffused and scattered into the atmosphere as sulfur dioxide, or the one not oxidized is diffused as atomic S along the grain boundary at high speed from the wire surface to form a diffusion layer segregated in a high concentration on the grain boundary, or precipitated within the wire as a compound such as manganese sulfide thermodynamically more stable than the iron sulfide ($FeS_2$, FeS), so that no film of iron sulfide ($FeS_2$, FeS) can be generated on the wire surface. Even if the iron sulfide ($FeS_2$, FeS) is left or generated even in a trace amount on the wire surface, the iron sulfide ($FeS_2$, FeS) is never left on the wire surface since the wire is pickled after annealing. Further, the iron sulfide ($FeS_2$, FeS) can not be present on the outermost surface of the wire since copper plating is performed after pickling.

In this invention, iron sulfide ($FeS_2$, FeS) is made present in film form on the wire surface, whereby the wire feeding oil can be prevented from being disadvantageously fallen from the wire surface and accumulated in the spring liner. The iron sulfide ($FeS_2$, FeS) on the wire surface has an excellent effect of retaining the wire feeding oil to prevent the oil deposit from the wire surface in the spring liner. This can be supposed to be due to the effect of improving the wettability, conformability, or bonding strength with the wire feeding oil of the iron sulfide ($FeS_2$, FeS) generated in thin film form on the wire surface.

To generate the iron sulfide ($FeS_2$, FeS) on the wire surface, it is most easy to dip the wire in an aqueous solution of a sulfide of alkali metal (NaS, KS or the like) or ammonium sulfide. The most important point in the process of generating the iron sulfide ($FeS_2$, FeS) is that the operation is performed at a temperature lower than the decomposing temperature of iron sulfide ($FeS_2$, FeS) in the atmosphere, and it is necessary to perform the operation at a temperature of, desirably, 200° C. or lower which is the decomposing temperature of FeS and, at the minimum, less than 600° C. which is the decomposing temperature of $FeS_2$. The iron sulfide ($FeS_2$, FeS) generated on the wire is easily decomposed when passed through an annealing process of 600° C. or more after generation. Further, in addition to the dipping of the wire into the aqueous solution of sulfide, the iron sulfide ($FeS_2$, FeS) can be generated by a gas phase or liquid phase reaction using $H_2S$ gas, but this method is not preferred since it requires a high equipment cost. It is necessary not to apply the process of pickling or plating which inhibits the effect of the sulfide to the wire surface after the sulfide is generated on the wire surface.

Other than the iron sulfide ($FeS_2$, FeS), the same effect as in the iron sulfide ($FeS_2$, FeS) can be expected when a sulfide of S with an element of Mn, Ti, Cu, Cr, Ni, Al or Zn is generated on the wire surface. To generate such a sulfide on the wire surface, the content of a selected element is increased in the wire to generate the sulfide of the selected element in the same manner as in the generation of the above iron sulfide ($FeS_2$, FeS).

The generation of the iron sulfide ($FeS_2$, FeS) on the wire surface can be confirmed by ultrasonic cleaning of the wire surface with acetone to remove the applied oil and deposit followed by analysis by use of XPS (X-ray Photoelectron Spectroscopy) under conditions shown in Table 1.

TABLE 1

| XPS Analysis Conditions | |
|---|---|
| Device | Parkin Elmer PHI5400 |
| X-ray source | Mg Kα |
| Analysis area | Diameter 1.1 mm |
| Angle between detector and sample surface | 45° |
| Peak calibration | Hydrocarbon C(1s) binding energy is set to 284.7 eV |
| Sputtering | Not used (for observation of outermost surface) |

FIG. 1 is a graph showing the S (2P) binding energy distribution of a wire surface on which iron sulfide ($FeS_2$, FeS) is generated. The binding energy distribution shown in FIG. 1 is measured by XPS under the conditions shown in Table 1 described above. This measurement is performed while sputtering the wire surface with argon ion, the graph of T(0) in FIG. 1 shows the measurement result of the wire before sputtering, and the graph of T(0.5) shows the measurement result of the wire surface after sputtering (Ar ion sputtering, sputtering speed 3 nm/min as on $SiO_2$) for 0.5 minute with argon ion. T(1), T(2), T(3) similarly show the measurement results of the wire surface after sputtering for 1 minute, 2 minutes and 3 minutes, respectively.

As shown in FIG. 1, the peak of binding energy of $FeS_2$ appears near 162.8 eV, and the peak of binding energy of FeS appears near 161.6 eV. Since the iron sulfide ($FeS_2$, FeS) is generated only on the wire surface, the peak height of $FeS_2$ and FeS is decreased when the wire surface is rubbed by extending the sputtering time. Therefore, when the wire surface is analyzed by XPS without sputtering, the binding energy distribution of a material present on the wire surface can be provided from the energy spectrum of photo-electron, whereby the presence of iron sulfide ($FeS_2$, FeS) can be confirmed. The presence of iron sulfide can be confirmed by the peak of binding energy of Fe (2P), in stead of the peak binding energy of S (2P).

The quantity of S on the wire surface can be analyzed by use of XPS similarly to the presence of the iron sulfide ($FeS_2$, FeS) on the wire surface. Since other C sources such as acetone for degreasing are left on the wire surface, the area of peak of S (2P) per total area of all peaks excluding carbon (C) is calculated, whereby the atomic % of S present on the wire surface can be determined. When another sulfides, for example NiS or MnS, are present on the surface of degrease wire, the peak of binding energy of NiS appears 162.2 eV. In case of MnS, the peak of binding energy appears near 162.5 eV. For reference, the peak of binding energy of S, not sulfides, appears 164.0 eV.

Preferred Embodiments of the Invention

Preferred embodiments of welding wires according to this invention are further specifically illustrated in comparison with reference examples.

First Example

Carbon steel fluxes of F1–F4 having compositions shown in Table 3 were filled in metal hoops of H1–H4 having compositions shown in Table 2 in various combinations to form raw materials, which were then drawn, whereby carbon steel flux-contained wires having wire diameters of 0.8–1.6 mm were manufactured. As shown in Table 3, the fluxes were filled within the hoops so that the weight of flux per total weight of wire is 8, 10, 12, 14, 16, and 18 wt. %, respectively, by increasing and decreasing the wt. % of Mn and Fe powders.

TABLE 2

Chemical Composition of Hoop (wt %)

| Hoop | C | Si | Mn | P | S |
|---|---|---|---|---|---|
| H1 | 0.08 | 0.08 | 0.2 | 0.015 | 0.020 |
| H2 | 0.08 | 0.8 | 0.7 | 0.009 | 0.005 |
| H3 | 0.06 | 1.2 | 0.4 | 0.010 | 0.015 |
| H4 | 0.01 | 0.04 | 1.5 | 0.013 | 0.005 |

TABLE 3

Chemical Composition of Carbon Steel Flux (wt %)

| Flux Code | Fe | Mn | Other metal powder | Oxide | Other compound |
|---|---|---|---|---|---|
| F1 | 35 | 10 | 3 | 45 | 7 |
| F2 | 45 | 10 | 3 | 40 | 2 |
| F3 | 55 | 10 | 3 | 30 | 2 |
| F4 | 75 | 15 | 3 | 5 | 2 |

Raw materials of B1–B8 having compositions shown in Table 4 were drawn, whereby carbon steel solid wires having wire diameters of 0.8–4.8 mm were manufactured.

TABLE 4

Chemical Composition of Carbon Steel Solid Wire (wt %)

| Raw mat. | C | Si | Mn | P | S | Cr | Mo | Ti |
|---|---|---|---|---|---|---|---|---|
| B1 | 0.04 | 0.8 | 1.2 | 0.010 | 0.02 | 0.03 | — | 0.2 |
| B2 | 0.04 | 0.8 | 1.3 | 0.009 | 0.005 | — | — | 0.19 |
| B3 | 0.08 | 1.2 | 1.0 | 0.015 | 0.015 | 0.03 | — | 0.13 |
| B4 | 0.07 | 1.1 | 1.2 | 0.016 | 0.003 | 0.03 | — | 0.12 |
| B5 | 0.09 | 0.8 | 1.6 | 0.012 | 0.015 | 0.03 | — | — |
| B6 | 0.09 | 0.8 | 1.6 | 0.010 | 0.005 | 0.02 | — | — |
| B7 | 0.08 | 1.3 | 1.5 | 0.015 | 0.03 | 0.5 | 0.8 | 0.05 |
| B8 | 0.09 | 1.0 | 1.2 | 0.011 | 0.006 | 0.6 | 0.4 | 0.03 |

Further, stainless steel fluxes of F5–F6 having compositions shown in Table 6 were filled in hoops of H5–H6 having compositions shown in Table 5 in various combinations to form raw materials, which were then drawn, whereby stainless steel flux-contained wires having wire diameters of 0.8–1.6 mm were manufactured. The fluxes were filled into the hoops so that the flux weight per total weight of wire is 15–25 wt. %.

TABLE 5

Chemical Composition of Hoop (wt %)

| Hoop | C | Si | Mn | P | S | Ni | Cr |
|---|---|---|---|---|---|---|---|
| H5 | 0.02 | 0.4 | 1.2 | 0.015 | 0.015 | 8.1 | 19.2 |
| H6 | 0.03 | 0.4 | 1.3 | 0.019 | 0.003 | 9.5 | 20.1 |

TABLE 6

Chemical Composition of Stainless Steel Flux (wt %)

| Flux | Fe | Ni | Cr | Other metal powder | Oxide | Other compound |
|---|---|---|---|---|---|---|
| F5 | 39 | 3 | 20 | 9 | 25 | 4 |
| F6 | 32 | 6 | 21 | 7 | 28 | 6 |

Raw materials of B9–B17 having compositions shown in Table 7 were also drawn, whereby stainless steel solid wires having wire diameters of 0.8–1.6 mm were manufactured.

TABLE 7

Chemical Composition of Stainless Steel Solid Wire (wt %)

| Raw mat. | C | Si | Mn | P | S | Ni | Cr | Mo | Nb |
|---|---|---|---|---|---|---|---|---|---|
| B9 | 0.04 | 0.4 | 2.0 | 0.015 | 0.010 | 9.5 | 20.0 | — | — |
| B10 | 0.04 | 0.4 | 1.9 | 0.015 | 0.002 | 9.2 | 21.0 | — | — |
| B11 | 0.02 | 0.5 | 1.9 | 0.020 | 0.015 | 9.1 | 19.5 | — | — |
| B12 | 0.04 | 0.5 | 1.8 | 0.020 | 0.015 | 12.5 | 23.0 | — | — |
| B13 | 0.05 | 0.5 | 2.1 | 0.021 | 0.002 | 12.8 | 23.2 | — | — |
| B14 | 0.02 | 0.3 | 2.3 | 0.025 | 0.011 | 12.4 | 19.5 | 3.0 | — |
| B15 | 0.02 | 0.4 | 2.2 | 0.020 | 0.003 | 12.7 | 19.8 | 2.5 | — |
| B16 | 0.04 | 0.4 | 1.9 | 0.019 | 0.015 | 10.0 | 20.1 | — | 0.7 |
| B17 | 0.04 | 0.4 | 2.0 | 0.023 | 0.002 | 9.5 | 19.1 | — | 0.6 |

Of the resulting carbon steel flux-contained wires, carbon steel solid wires, stainless steel flux-contained wires, and stainless steel solid wires, a plurality of wires were selectively dipped in an aqueous solution of a sulfide of alkali metal (NaS, KS or the like) or ammonium sulfide to generate iron sulfide ($FeS_2$, FeS) on the wire surfaces. Animal and plant oil, synthetic oil, or a mixture thereof was applied to all the wires as wire feeding oil in an amount of 0.5–2 g per 10 kg of the wire. The wires of Example having the iron sulfide ($FeS_2$, FeS) generated on the surfaces and wires of Comparative Example having no treatment after drawing were manufactured. The quantity of S in iron sulfide ($FeS_2$, FeS) on the wire surface can be regulated by changing the dipping time of the wire to the above aqueous solution.

Under the conditions shown in Table 1, all the wire surfaces of the Example and Comparative Example were analyzed by X-ray photoelectron spectroscopy. Consequently, the same peak as T(0) in FIG. 1 could be confirmed with respect to all the wires of Examples. Namely, iron sulfides ($FeS_2$, FeS) were generated on all the wire surfaces of Examples.

Thereafter, the end surfaces of the wires of the same kind were joined by resistance welding, and the effect on wire resistance weldability of the quantity of S in hoop or in wire were examined. The wire resistance weldability was evaluated by examining the wet angle, the wettability and conformability of weld metal in weld part, the weld part rupture frequency in drawing, the fluctuation of arc length in weld part in arc welding by use of this wire.

The wire feedability or the quantity of oil deposit from wire surface in spring liner was evaluated by measuring the mass change of the spring liner before and after continuous welding.

Figure 2:
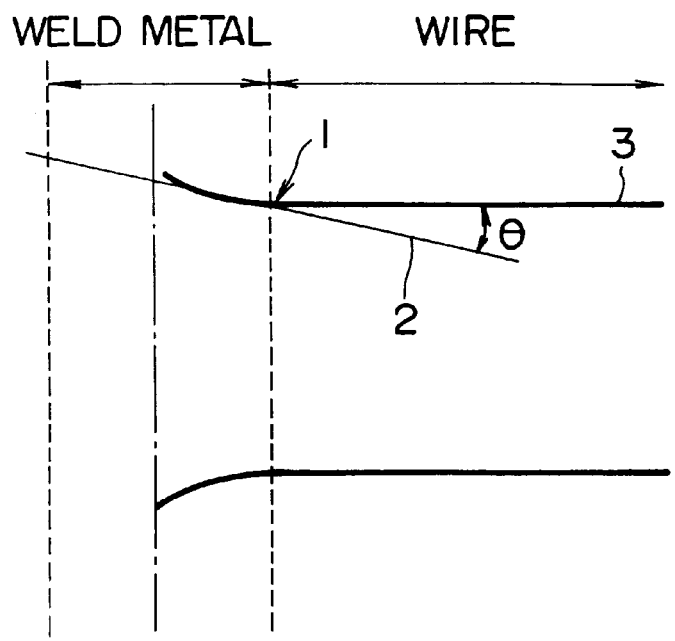
FIG. 2 shows a view showing a weld part when end surfaces of wires according to a preferred embodiment are mutually joined by resistance welding.
Figure 3:
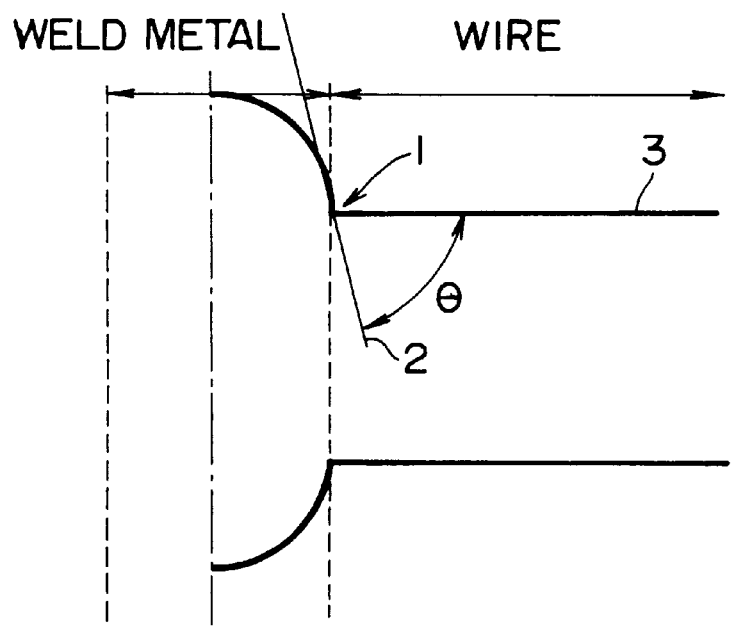
FIG. 3 shows a view showing a weld part when end surfaces of wires according to a comparative example are mutually joined by resistance welding.

FIG. 2 is a view showing a weld part when end surfaces of the wires of the Example were mutually joined by resistance welding, and FIG. 3 is a view showing a weld part when end surfaces of the wires of the Comparative Example were joined by resistance welding. As shown in FIGS. 2 and 3, the wettability between weld metal and wire surface can be evaluated by measuring the wet angle θ. The wet angle θ means the angle formed by the tangent 2 of the weld metal surface passing the contact 1 between the weld metal surface and the wire surface and the wire surface 3, and a smaller wet angle θ shows higher wettability of the wire surface and more satisfactory conformability.

The manufacturing condition of the wires and the method of generating iron sulfides ($FeS_2$, and FeS) are shown in Table 8, and the quantity of S in wire or in hoop, the presence of iron sulfide ($FeS_2$, FeS) on the wire surface, and the quantity of S on the wire surface are shown in Table 9, and the evaluation results of wire resistance weldability and wire feedability are shown in Tables 10, 11.

TABLE 8

| | No. | Used hoop/ used flux or used raw mat. | Flux ratio (%) | Wire diam. (mm) | Method/time of generating iron sulfide (FeS$_2$, FeS) |
|---|---|---|---|---|---|
| Ex. | 1 | H2/F4 | 16 | 1.2 | Dipped in NaS aq soln/1 sec |
| | 2 | H3/F3 | 18 | 1.6 | Dipped in NaS aq soln/2 sec |
| | 3 | B2 | — | 0.8 | Dipped in KS aq soln/15 sec |
| | 4 | B5 | — | 1.2 | Dipped in KS aq soln/30 sec |
| | 5 | H6/F6 | 20 | 1.2 | Dipped in NaS aq soln/1 sec |
| | 6 | B11 | — | 1.0 | Dipped in KS aq soln/15 sec |
| | 7 | B15 | — | 1.2 | Dipped in NaS aq soln/30 sec |
| | 8 | B17 | — | 0.8 | Dipped in KS aq soln/30 sec |
| Comp. Ex. | 9 | H1/F2 | 12 | 1.2 | Dipped in KS aq soln/30 sec Annealed at 700° C. for 60 min |
| | 10 | H4/F1 | 10 | 1.4 | — |
| | 11 | B3 | — | 3.2 | — |
| | 12 | B4 | — | 0.8 | — |
| | 13 | H5/F5 | 15 | 1.2 | — |
| | 14 | B9 | — | 1.2 | — |
| | 15 | B17 | — | 0.8 | — |

TABLE 9

| | No. | Quantity of S in wire or in hoop (wt %) | Iron sulfide (FeS$_2$, FeS) on wire surface | Quantity of S on wire surface (atomic %) |
|---|---|---|---|---|
| Ex. | 1 | 0.005 | Present | 0.15 |
| | 2 | 0.015 | Present | 0.28 |
| | 3 | 0.005 | Present | 5.1 |
| | 4 | 0.015 | Present | 18.9 |
| | 5 | 0.003 | Present | 0.5 |
| | 6 | 0.015 | Present | 5.7 |
| | 7 | 0.003 | Present | 8.2 |
| | 8 | 0.002 | Present | 11.5 |
| Comp. Ex. | 9 | 0.02 | Nil | 0.2 |
| | 10 | 0.005 | Nil | tr. |
| | 11 | 0.015 | Nil | tr. |
| | 12 | 0.003 | Nil | tr. |
| | 13 | 0.015 | Nil | tr. |
| | 14 | 0.010 | Nil | tr. |
| | 15 | 0.002 | Nil | tr. | tr: trace element

TABLE 10

Evaluation result of wire resistance weldability

| | No. | Wet angle (°) | Wettability and conformability | Weld part rupture frequency in drawing (Frequency/10 t) | Fluctuation of arc length in weld part in arc welding |
|---|---|---|---|---|---|
| Ex. | 1 | 11 | ○ | 0 | Nil |
| | 2 | 15 | ○ | 0 | Nil |
| | 3 | 9 | ○ | 0 | Nil |
| | 4 | 5 | ○ | 0 | Nil |
| | 5 | 12 | ○ | 0 | Nil |
| | 6 | 8 | ○ | 0 | Nil |
| | 7 | 7 | ○ | 0 | Nil |
| | 8 | 13 | ○ | 0 | Nil |
| Comp. Ex. | 9 | 62 | Δ | 5 | Present |
| | 10 | 55 | x | 8 | Present |
| | 11 | 49 | x | 4 | Present |
| | 12 | 71 | x | 6 | Present |
| | 13 | 61 | x | 3 | Present |
| | 14 | 53 | x | 10 | Present |
| | 15 | 46 | x | 6 | Present |

TABLE 11

Evaluation of Oil Deposit (wire speed 12/min, 24-hr continuous feed test)

| | No. | Quantity of Oil Deposit (g/10 kg wire) | Feeding Failure |
|---|---|---|---|
| Ex. | 1 | 0.05 | non stop (continuous feeding) |
| | 2 | 0.03 | non stop (continuous feeding) |
| | 3 | 0.02 | non stop (continuous feeding) |
| | 4 | 0.01 | non stop (continuous feeding) |
| | 5 | 0.07 | non stop (continuous feeding) |
| | 6 | 0.02 | non stop (continuous feeding) |
| | 7 | 0.03 | non stop (continuous feeding) |
| | 8 | 0.01 | non stop (continuous feeding) |
| Comp. Ex. | 9 | 1.0 | After 19 hr |
| | 10 | 1.5 | After 15 hr |
| | 11 | 0.9 | After 22 hr |
| | 12 | 1.4 | After 20 hr |
| | 13 | 1.7 | After 13 hr |
| | 14 | 1.1 | After 18 hr |
| | 15 | 1.3 | After 16 hr |

As shown in Tables 8–10 and FIGS. 2 and 3, in Examples No. 1–8 having iron sulfide (FeS$_2$, FeS) present on wire surfaces, the wet angle θ is minimized, compared with the Comparative Example, regardless of the quantity of S in wire or in hoop to enhance the wettability and conformability in resistance welding, and the weld part is never fractured in drawing. In table 10, "○" mark means good wettability and good conformability. The shape of weld metal of any one of Examples No. 1–8 is concave. Further, the arc length was never fluctuated in the weld part in arc welding by use of these wires. Fluctuation of arc length was studied by H. S. V. (High Speed Video, 2000 frames/sec). In table 10, "Nil" means that arc length fluctuation is within 5 times wire dia.

On the other hand, in Comparative Examples No. 9–15 having no iron sulfide (FeS$_2$, FeS) present on wire surfaces, the wettability and conformability of weld metal were defective to require a long-time filing after welding, and the weld part was ruptured in drawing. The wire surface with which the weld metal makes contact was also notched because of the large wet angle θ, and the stress became easily collected in this part. Thus, the tendency for the wire to fracture in the notched part increased. In table 10, "x" mark means poor wettability and poor conformability. The shape of weld metal of any one of Examples No.9–15 is convex. Further, the arc length was fluctuated in the weld part in arc welding. In table 10, "Present" means that arc length fluctuation is more than 5 times wire dia. The wire resistance weldability was determined depending on the presence of iron sulfide (FeS$_2$, FeS) on the wire surface regardless of the amount of S in wire or in hoop.

As shown in Table 11, Examples No. 1–8 having iron sulfide (FeS$_2$, FeS) present on wire surfaces have no trouble in feeding even in 24-hr continuous feed test, and the oil deposit in spring liner is little as 0.1 g/10 kg wire.

On the other hand, in Comparative Examples No. 9–15 having no iron sulfide (FeS$_2$, FeS) present on wire surfaces, a feeding failure is caused in continuous feeding, and the oil deposit in spring liner is extremely large as about 1 g/10 kg wire. The analysis of the deposit component in spring liner showed that the most part was formed of the wire feeding oil. The wire feedability was determined depending on the presence of iron sulfide (FeS$_2$, FeS) on wire surface regardless of the quantity of S in wire or in hoop.

Second Example

Various welding wires were manufactured by use of hoops, fluxes, or raw materials shown in Tables 2–7, and these were dipped in an aqueous solution of a sulfide of alkali metal (NaS, KS or the like) to generate the sulfide on the wire surface. To all the wires, animal and plant oil, synthetic oil or a mixture thereof was applied as wire feeding oil in an amount of 0.5–2 g per 10 kg of wire. In the same manner as in the first example, effects on wire resistance weldability and wire feedability of the quantity of S in hoop or in wire were examined. The manufacturing condition of wire and generating method of sulfide were shown in Table 12, the quantity of S in wire or in hoop, presence of sulfide on wire surface, and the quantity of S on wire surface are shown in Table 13, and the evaluation results of wire resistance weldability and wire feedability are shown in Tables 14 and 15.

TABLE 12

|  | No. | Used hoop/ used flux or used raw mat. | Flux ratio (%) | Wire diam. (mm) | Method/time of generating iron sulfide |
|---|---|---|---|---|---|
| Ex. | 16 | H4/F3 | 13 | 1.2 | Dipped in NaS Aq soln/1 sec |
|  | 17 | B5 | — | 1.2 | Dipped in NaS aq soln/20 sec |
|  | 18 | B1 | — | 1.0 | Dipped in KS aq soln/15 sec |
|  | 19 | H9/F7 | 16 | 1.4 | Dipped in KS aq soln/3 sec |
|  | 20 | B10 | — | 1.2 | Dipped in NaS aq soln/20 sec |
|  | 21 | B11 | — | 0.9 | Dipped in KS aq soln/30 sec |

TABLE 13

|  | No. | Quantity of S in wire or in hoop (wt %) | Kind of sulfide on wire surface | Quantity of S on wire surface (atomic %) |
|---|---|---|---|---|
| Ex. | 16 | 0.005 | MnS, FeS | 0.19 |
|  | 17 | 0.015 | MnS, FeS | 0.5 |
|  | 18 | 0.02 | TiS, FeS | 3.7 |
|  | 19 | 0.015 | NiS, CrS | 0.3 |
|  | 20 | 0.002 | NiS, CrS | 11.4 |
|  | 21 | 0.011 | NiS, CrS, MnS, MoS | 17.9 |

TABLE 14

Evaluation Result of Wire Resistance Weldability

|  |  | Wet angle (°) | Wettability and conformability | Weld part rupture frequency of in drawing (frequency/10 t) | Fluctuation of arc length in weld part in arc welding |
|---|---|---|---|---|---|
| Ex. | 16 | 13 | ○ | 0 | Nil |
|  | 17 | 10 | ○ | 0 | Nil |
|  | 18 | 7 | ○ | 0 | Nil |
|  | 19 | 12 | ○ | 0 | Nil |

TABLE 14-continued

Evaluation Result of Wire Resistance Weldability

|  |  | Wet angle (°) | Wettability and conformability | Weld part rupture frequency of in drawing (frequency/10 t) | Fluctuation of arc length in weld part in arc welding |
|---|---|---|---|---|---|
|  | 20 | 11 | ○ | 0 | Nil |
|  | 21 | 8 | ○ | 0 | Nil |

TABLE 15

Evaluation of Oil Deposit (wire speed 12 m/min, 24-hr continuous feed test)

|  |  | Quantity of Oil Deposit (g/10 kg wire) | Feeding Failure |
|---|---|---|---|
| Ex. | 16 | 0.03 | non stop (continuous feeding) |
|  | 17 | 0.04 | non stop (continuous feeding) |
|  | 18 | 0.01 | non stop (continuous feeding) |
|  | 19 | 0.04 | non stop (continuous feeding) |
|  | 20 | 0.01 | non stop (continuous feeding) |
|  | 21 | 0.01 | non stop (continuous feeding) |

As shown in Tables 12 and 13, in Examples No. 16–21 having sulfides present on wire surfaces, the wet angle θ is minimized regardless of the quantity of S in wire or in hoop to enhance the wettability in resistance welding, and the weld part is never fractured in drawing. The arc length was never fluctuated in the weld part even when arc welding was performed by use of these wires.

As shown in Table 15, Examples Nos. 16–21 having sulfides present on wire surfaces have no trouble in feeding even in 24-hr continuous feed test regardless of the quantity of S in wire or in hoop, and the oil deposit in spring liner is little as less than 0.1 g.

What is claimed is:

1. A welding wire comprising an interior and a surface layer having an outer surface, wherein the surface layer comprises all elements present in the interior;

the surface layer further comprises at least one iron sulfide selected from the group consisting of FeS$_2$ and FeS underneath the outer surface of the surface layer of the welding wire; and S in the at least one iron sulfide is chemically bonded to the welding wire; wherein S present as the iron sulfide is contained in an amount of 0.1–20 atomic % as measured by X-ray photoelectron spectroscopy.

2. A welding wire comprising a wire surface, wherein a sulfide of at least one element selected from the group consisting of Mn, Ti, Cu, Cr, Ni, Al and Zn is present on the wire surface.

3. The welding wire according to claim 2, wherein S present as the sulfide is contained in an amount of 0.1–20 atomic % as measured by X-ray photoelectron spectroscopy.

4. The welding wire according to claim 2, wherein the sulfide covers all of the wire surface except for portions of the wire surface on ends of the welding wire.

5. A welding wire comprising an interior and a surface layer having an outer surface, wherein the surface layer comprises all elements present in the interior;

the surface layer further comprises a sulfide of at least one element selected from the group consisting of Mn, Ti, Cu, Cr, Ni, Al and Zn underneath the outer surface of the surface layer of the welding wire; and S in the sulfide is chemically bonded to the welding wire.

* * * * *